Feb. 11, 1958 E. R. DYE 2,823,045
PASSENGER SAFETY BELT KIT FOR ATTACHMENT TO VEHICLES
Filed Feb. 10, 1955 2 Sheets-Sheet 1
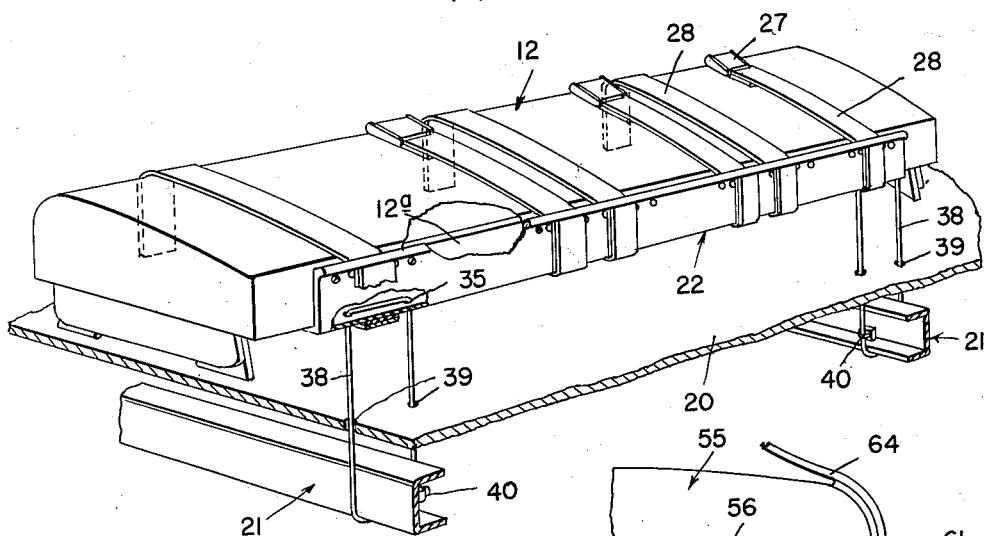
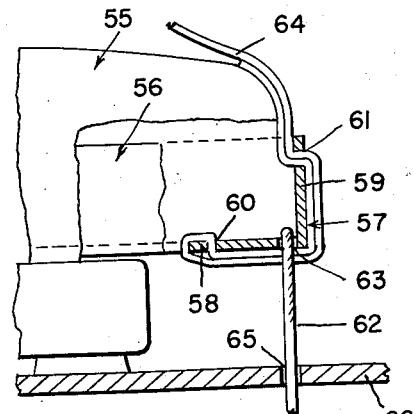
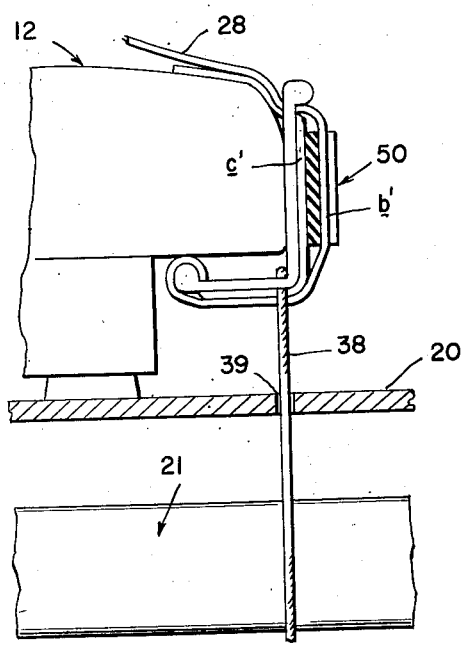
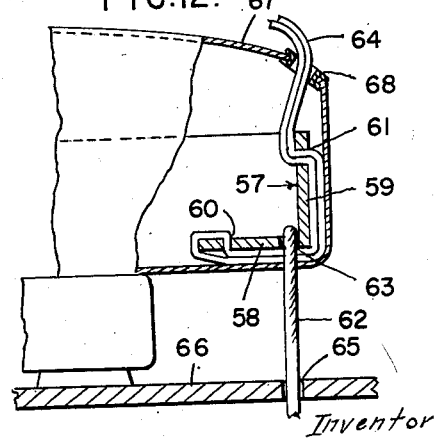
Inventor
Edward R. Dye
By Shoemaker & Mattare
ATTYS.

Feb. 11, 1958     E. R. DYE     2,823,045
PASSENGER SAFETY BELT KIT FOR ATTACHMENT TO VEHICLES
Filed Feb. 10, 1955     2 Sheets-Sheet 2
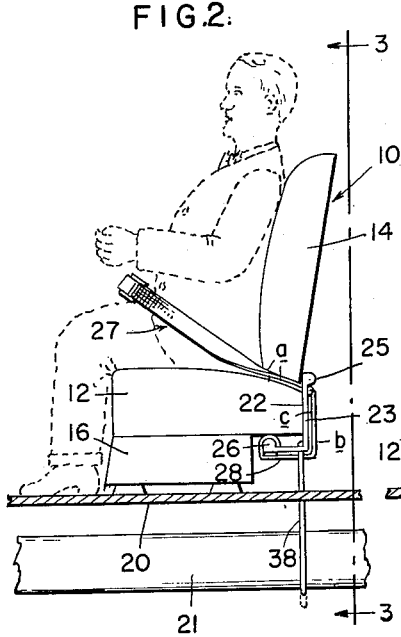
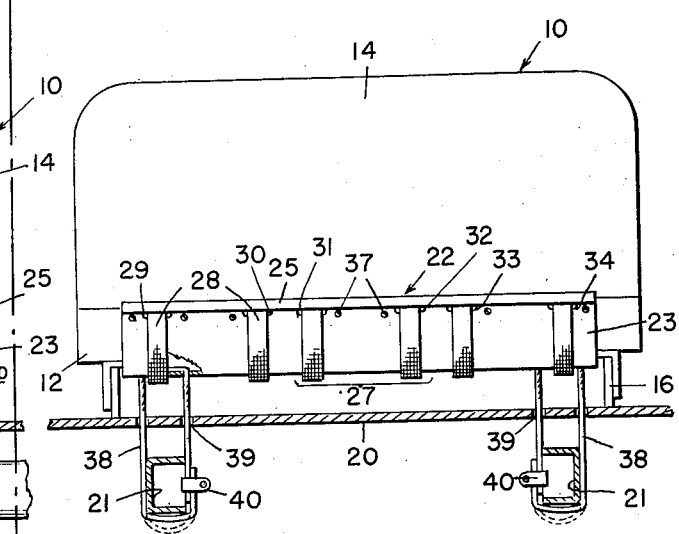
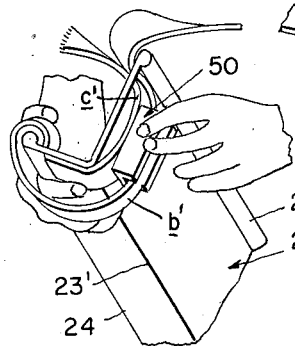
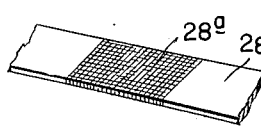
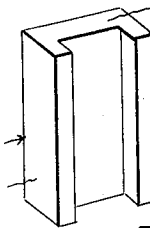
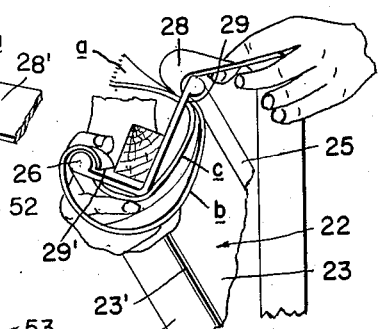
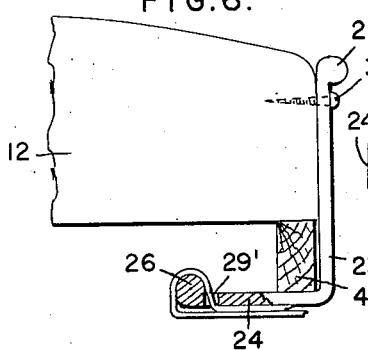
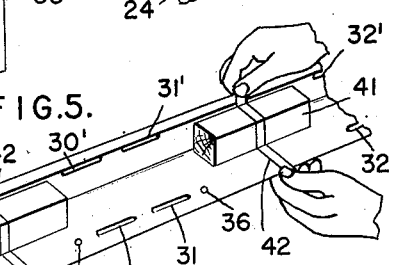
Inventor
Edward R. Dye
By Shoemaker & Mattare
ATTYS.

2,823,045

Patented Feb. 11, 1958

United States Patent Office

2,823,045

PASSENGER SAFETY BELT KIT FOR ATTACHMENT TO VEHICLES

Edward R. Dye, Orchard Park, N. Y., assignor to Hickok Manufacturing Co. Inc., Rochester, N. Y., a corporation of New York Application February 10, 1955, Serial No. 487,271

24 Claims. (Cl. 280—150)

This invention relates generally to improvements in safety devices for use in automotive or other vehicles.

In the operation of motor vehicles it frequently occurs that quick stops are required to avoid accidents and in such instances the occupants of the vehicle, being unprepared, may be thrown forwardly and are frequently injured by striking the vehicle windshield or the instrument panel, the back of the front seat or some other part of the vehicle and in the event of a head-on collision the occupants may be thrown forwardly with even greater force than would occur from sudden application of the vehicle brakes.

In the operation of aircraft also when crashes occur passengers are frequently injured in the same manner as a result of inertia, being thrown forwardly against adjacent seats or against other objects in the craft and under such conditions as well as in the event of sudden stops or crashes in motor vehicles severe injury would, in most cases, either be prevented or injury would be slight if the occupant of the seat were secured in a suitable manner for holding him in his seat or checking his forward movement.

Injury may also be sustained by pets which may be riding in the vehicle, or damage may be caused to delicate, inanimate bodies, as a result of sudden stops or collisions.

It is known that a number of different devices have been proposed for holding a passenger in his seat but such devices have not been satisfactory for a number of reasons. In some such prior devices use has been made of straps for engagement around the body of the passenger and which straps have been attached directly to the seat. Since motor vehicle seats are movable, particularly the front seats which are mounted so that they may be shifted forwardly or backwardly and in some instances adjusted vertically to the most convenient position for the driver or operator of the vehicle, the sudden application of the vehicle brakes or any sudden stopping of the vehicle will cause the seat to move forwardly with the occupant and, therefore, a strap attached to the seat only has little value and would not save the passenger from injury. In other devices means have been provided for securing the ends of the strap directly to the vehicle floor by bolts or other devices but since the floors are conventionally of relatively light sheet metal the sudden strain applied to the bolts which would occur in the event of a crash would tear the bolts or other anchoring devices from the floor and the effectiveness of the safety strap would accordingly be destroyed. Also safety straps secured in this manner do not permit movement of the seat for adjusting its position.

In the light of the foregoing, it is a principal object of the present invention to provide a new safety device, or safety belt kit, for installation in a motor vehicle, or other type of vehicle adapted to carry passengers or cargo of any kind, by means of which an occupant of the vehicle seat, human or otherwise, may be firmly held thereon, or at least prevented from being thrown or shifted therefrom to any material extent, in the event of sudden stopping of the forward motion of the vehicle.

Another object of the invention is to provide a new and novel safety device of the character described having means associated therewith for connection with a part of the vehicle structure in such a manner that the device cannot be torn free and the occupied seat cannot be thrown or shifted to any extent from its normal position.

Still another object of the invention is to provide a device of the character stated comprising a strap for engagement about the body of the seat occupant, with means for securing the strap to the seat structure and other means for connecting the seat structure carried means to the vehicle chassis to hold the seat structure and the seat carrying means in position.

Still another object of the invention is to provide in a device of the character stated, means for attachment to the rear portion of a vehicle seat structure whereby a number of occupant holding straps can be firmly fixed in operative position without requiring any alteration in the seat structure.

A further object of the invention is to provide a vehicle seat structure for a motor vehicle, either a front seat, a rear seat, or both, having as a part of its original construction, safety straps secured to the seat frame and means connecting the part of the seat frame to which the straps are secured, to an underlying portion of the vehicle chassis, whereby an occupant of the seat may be safely secured thereto and the seat will be held against sudden undue forward or upward movement or both in the event of sudden stops resulting from quick brake application or collision.

A further and more specific object of the invention is to provide in a device of the character stated, an angle bar unit adapted to be secured to the rear portion of a vehicle seat structure to extend transversely of the latter, with a number of passenger securing straps attached thereto and with means for coupling the bar with the underlying side portions of the vehicle chassis frame whereby pulling strains applied to the straps will be transmitted through the bar to the chassis frame to effectively prevent forward or shifting movement of the seat structure to an undesirable extent.

Still another and more specific object of the invention is to provide in a device of the character above described, a means whereby the seat structure attached bar is connected with the underlying portions of the vehicle chassis frame in such manner that when the device is used in association with the front seat of a motor vehicle, slight forward, rearward or vertical adjustment of the seat may be made without interference from the safety device and without requiring the making of any changes in the attachment of the safety device to the seat and to the chassis frame.

Other objects and advantages of the invention will become apparent as the description of the same proceeds and the invention will be best understood from a consideration of the following detailed description taken in connection with the accompanying drawings forming a part of the specification with the understanding, however, that the invention is not confined to a strict conformity with the showing of the drawings but may be changed or modified within the scope of the appended claims.

In the drawings:

Fig. 1 is a rear perspective view of a conventional vehicle seat with portions of a vehicle floor and chassis, showing the application thereto of a safety device constructed in accordance with one embodiment of the invention, the seat back and supporting means therefor being omitted.

Fig. 2 is a view in side elevation on a reduced scale of a motor vehicle seat showing the application thereto of the safety device or safety belt kit of the present invention and showing in dotted outline a figure on the seat to illustrate the application of the holding belt, a portion of the seat supporting floor being shown in section with a portion of the underlying chassis frame to which the attachment is connected.

Fig. 3 is a vertical transverse section taken substantially on the line 2—2 of Fig. 1 showing the full rear elevation of a bulb angle bar secured to the rear of a seat and the connections between the bar and adjacent underlying portions of the chassis frame, the dotted line indication of the lower portion of the anchor cable representing slack occurring therein when the seat, if of the vertically adjustable form, is lowered from its fully raised position.

Fig. 4 is a perspective view illustrating the manner of connecting one end of a strap section with the bulb angle bar whereby the strap section is firmly secured thereto without the use of fastening elements.

Fig. 5 is a perspetcive view of the inner side of the bulb angle bar showing the strap receiving slots and illustrating one manner of positioning spacer blocks on the bar when the use of such blocks is required.

Fig. 6 is an end elevation of the bulb angle bar and a portion of a seat to which it is attached showing the use of a spacer block between the underside of the seat structure and the horizontal portion of the bar, a part of such horizontal portion of the bar being in section to illustrate the manner in which an end of a strap section is threaded through a slot therein.

Fig. 7 is a detailed perspective view corresponding to Fig. 4 and illustrating the use of one type of shock absorbing means in the form of a resilient or yieldable shock absorbing body under one part of the strap section for reducing shock to the seat occupant when a sudden pull is applied to the strap.

Fig. 8 is a view corresponding to Fig. 6 showing the resilient shock absorbing means in working position and in vertical section.

Fig. 9 is a view in perspective of the shock absorbing body.

Fig. 10 illustrates another shock absorbing means.

Fig. 11 illustrates one means of providing the bar portion as a built-in element of the seat structure.

Fig. 12 shows a variation of the built-in construction.

Referring now more particularly to the drawings the numeral 10 generally designates a conventionally illustrated seating unit of a motor vehicle which comprises the seat structure 12 and the back 14 therefor.

The numeral 16 designates generally the means by which the seat structure is supported upon and secured to the floor 20 and the numeral 21 designates portions of the side beams of the vehicle chassis frame to which the hereinafter described element of the safety device is secured.

The seat here illustrated is intended to represent any type of automotive seat structure either front or rear or a seat fixed in position or adapted to be adjusted forwardly or rearwardly and/or vertically, as the majority of front seats of motor vehicles are. In some makes of motor vehicles, the seat cushion is constructed as an integral part of a base frame which frame is coupled or secured to the vehicle floor so that, while the seat comprising the cushion and frame base, may be movable or adjustable horizontally, or may be vertically adjustable, no part can be removed or lifted out of the vehicle. In other makes of vehicles the seat cushion itself may be lifted out but it is supported on a base frame which base frame is non-removable, though it may be moved for adjustment in a forward or rearward direction or vertically or both vertically and horizontally forwardly and rearwardly. In other vehicles and older makes or models, the base frame for the seat cushion may be rigidly secured to the vehicle floor so that it is not movable in any manner or direction, though the seat cushion may be removably supported on the base frame.

In the following description of the invention, it will be understood that where reference is made to the connection, or attachment, of the invention to the seat structure such attachment will be to that part of the seat structure which is connected with the vehicle floor and therefore is not removable from the vehicle.

Figs. 1, 2 and 3 illustrate the application of the safety device to a seat structure and to the underlying portions of the side members of the vehicle chassis frame, these views illustrating the mounting of the hereinafter described bar, preferably, but not necessarily, a bulb angle bar, to the back of the seat structure 12 without the employment of the hereinafter referred to spacer blocks.

The safety device in the form illustrated in Figs. 1 to 8, comprises an elongate bulb angle bar which is generally designated 22. This bar is of a length approximating or slightly less than the length of the back portion of the seat 12 to which it is attached.

The bar 22 embodies a vertical flange portion 23 and a lower horizontal flange portion 24 and the outer longitudinal edge of the vertical flange portion 23 is defined by the roll or bulb 25 which projects from or may be defined as lying against the outer face of the vertical flange while the horizontal or lower flange has extending along the free longitudinal edge thereof and upon the inner face the bulb or thickened rib 26 which, like the bulb 25, is of substantially circular cross-section.

The bulb angle bar 22 is illustrated as having the flange 23 of somewhat greater height or width than the flange 24 which is horizontally disposed when the bar is in applied position but it is to be understood that the flanges may be of the same width if desired or otherwise proportioned for most advantageous use.

The bar 22 is provided with suitable pairs of slots in the vertical and horizontal flanges 23 and 24 thereof to facilitate the attachment thereto of a desired number of safety straps. In the bar here illustrated it will be seen upon reference to Fig. 3 that provision is made for the attachment to the bar of three straps, each of which embodies two portions and is generally designated 27, so as to accommodate three persons on the seat. However, the bar may be made with suitable slots to accommodate two straps if desired and as shown each of the two separate portions, of which the strap is made up, is designated 28 and one strap portion carries a conventional type of buckle, generally designated 28' with which the free end of the other or cooperating portion 28 is connected thus forming the complete strap.

Upon reference particularly to Fig. 5 it will be seen that the angle bar is provided adjacent to one end with a pair of slots 29 and 29' which are spaced transversely of the bar, the slot 29 being in and formed lengthwise of the flange 23 in close proximity to the bulb or rib 25 while the slot 29' which cooperates with the slot 29 in holding one strap section as hereinafter described, is formed longitudinally of the horizontal flange and longitudinally thereof in close proximity to the bulb or rib 26.

Spaced inwardly and longitudinally from the pair of slots 29—29' is a second pair of similar slots designated 30 and 30', the slot 30 being in line with the slot 29 and formed in the flange 23 and the slot 30' being formed in the flange 24 and being in line longitudinally thereof with the slot 29'. This second pair of slots cooperate to secure an end of the other strap portion which is designed to be joined to the strap portion engaged in the slots 29—29'. There are thus formed two pairs or a set of slots in this end portion of the bar in which the portions of one strap may be engaged and in the structure here illustrated and as is clearly shown in Fig. 2 there are two more similar sets of slots, one being in the central portion of the bar and the other being at the opposite end thereof so that three safety straps may be attached. The slots of the middle set are designated 31 and 31' corresponding to slots 29 and 29' and 32 and 32' corresponding to the slots 30 and 30'. In the vertical web 23 only the slots corresponding to slots 29—30 and 31—32 are illustrated and these are designated 33 and 34. It will be understood, of course, that in the horizontal flange 24 there are formed, but not shown, slots for coaction with the slots 33 and 34 as will be readily obvious.

Adjacent to each end of the bar 22 the horizontal flange 24 is provided at the inner side or adjacent to the flange 23 with two longitudinally spaced apertures 35 through which are extended the hereinafter described tie cables.

In the vertical flange 23 a suitable number of longitudinally spaced apertures 36 are formed in close proximity to the rib or bulb 25 for the passage of mounting and securing screws.

When the bar 22 is mounted for use along the back of the seat structure 12 as illustrated in Figs. 1, 2 and 3, the horizontal flange 24 is disposed beneath the rear of the fixed seat base or frame and the vertical flange is disposed uprightly or vertically against the back of the seat structure and suitable securing screws 37 are passed through the openings 36 into the back of the fixed or non-removable frame or base of the seat structure to hold the bar in place.

Before mounting the bar in the manner stated, the two halves or portions 28 of each safety strap are each threaded at one end through a pair of transversely spaced slots such, for example, as the cooperating slots 29 and 29', 30 and 30' etc., as illustrated in Fig. 4. In this view the pair of cooperating slots 29—29' are indicated and in attaching a strap section to the bar through these slots an end a is first passed through the slot 29 from the inner side of the flange 23 to the outer side and is carried across the outer side of this flange, around the corner 23' and across the underside of the bottom or horizontal flange 24, then across the top of the rib or bulb 26 to and through the slot 29'. The end of the strap is then carried back across the underside of the flange 24 around the corner 23' and up across the outer side of the vertical flange 23 back to the slot 29 through which it is extended to the inner side of this flange. Thus it will be seen that the applied or attached end of the strap portion forms an outer loop b and an inner loop c, the inner loop lying between the outer loop b and the outer faces of the vertical and horizontal flanges 23 and 24. From this, it will be apparent that when the other end of the strap portion is carried up between the seat cushion and the lower part of the seat back and is pulled tight the two loops b and c will be drawn tight, the outer loop pressing against the inner loop so that a tight frictional connection will be established between the looped portions b and c of the strap and the bar, the tightness of which will be increased with increased pull or strain on the strap.

In Figs. 1, 2 and 3 tie elements 38 are illustrated by means of which the bar 22, after being secured to the back of the seat structure, is coupled with the underlying side portions 21 of the vehicle chassis frame. These elements are shown as cables, such as multiple strand steel cables, and such are preferred. However, other suitable anchoring elements may be employed as may be dictated by the type of seat structure being dealt with, such as chains, wires or the like, or plastic encased steel cables may be employed as these would have the added advantage of slight resiliency and freedom from noise such as might result from the contact between bare steel wire and the metal of the chassis frame around which it is secured. While in the following description the elements 38 may be referred to as cables, it is to be understood that this term is used in a generic sense and does not imply any limitation.

Each of these cables extends through a pair of openings 35 adjacent to an end of the bar and the ends of the cable are carried down through suitable openings 39 formed in the floor 20 and are joined and secured together under or at the innerside of the chassis frame member 21 by means of a suitable cable clamp 40 or in any other desired manner.

After the portions 28 of each of the safety straps are attached to the bar 22 in the manner illustrated in Fig. 4 and above described, the other ends of the straps are passed between the seat back and the cushion and the bar is placed in position against the back of the seat structure as hereinbefore described and secured by the screws 37 which pass through the openings 36 into the back of the seat frame. The ends of the previously applied or attached cables 38 are then extended down through the floor of the car and joined together and secured in the manner illustrated and described.

The bar 22 when applied as shown in Figs. 1, 2 and 3, has the portions of the strap sections passing across the top of the rib or bulb 26 directly in contact with the underside of the seat frame or base and the top edge of the vertical flange 23 is located adjacent to the bottom edge of the seat back 14 so that the strap sections can conveniently pass between the seat back and the cushion in the manner shown.

In some instances, it may be found desirable in applying the bar to a seat structure to employ filler blocks 41 between the horizontal bottom flange 24 and the underside frame or base of the seat structure 12 as shown in Fig. 6, where the vertical flange of the angle bar has a height greater than the height of the back of the seat cushion, in order to properly position the flange and the slots therein. When the use of such filler blocks is desirable, the blocks, either two or three thereof, may be positioned on the bottom flange 24 and temporarily retained in place by the application of suitable tape 42 across the block and across the adjacent flanges, as illustrated, a tape such as the well known "Scotch tape" being particularly suitable for this purpose.

The restraining or anchoring cables 38 extend down from the bar through the floor apertures and around the underlying portions of the chassis frame as illustrated. Where the device may be applied to a seat structure which is fixed against adjustment either horizontally or vertically, the cables will be drawn down as tightly as possible and no consideration has to be given to yieldability or flexibility.

In the application of the device to a seat structure designed for horizontal adjustment, the seat structure is initially set in a central position of adjustment where the holes 39 in the floor are directly below the holes 35 in the angle bar. The cable ends are then pulled through the floor holes and around the chassis beams as tight as possible with the hands. The resilient cables will have sufficient spring remaining therein to allow the seat structure to move to the extreme forward or to the extreme rearward position.

In the case of vehicles having a seat structure mounting designed to allow both horizontal and vertical adjustment, the seat structure may be first set in the central position as stated and raised to the maximum height. The cables would then be drawn down and secured in the same manner as above stated. This would then produce some slack in the cable when the seat structure is lowered, as indicated in dotted lines in Figs. 2 and 3.

When such slack is present, if the necessity arises for the sudden application of the car brakes which would tend to throw the seat and the occupant forwardly or in the event of a collision, there will be a slight free upward and forward movement of the seat before the cables check such movement by being drawn tight against the undersides of the side beams of the chassis frame and thus the occupant of the seat will be subjected to some shock by being suddenly checked in his forward motion.

In order to absorb the shock incident to the sudden stopping of the slight free forward and upward movement of the seat under the conditions mentioned use may be made of a suitable shock absorbing means as, for example, a resilient body or element inserted in the manner illustrated in Figs. 7 and 8 between the looped portions $b$ and $c$ of each strap portion 28. Such resilient shock absorbing member is here generally designated 50 and in the form shown it comprises an elongate block 51 of rectangular outline formed of sponge or air foam rubber which is provided along one side with the longitudinal channel 52 bordered by the side portions or flanges 53. This resilient block is inserted, as illustrated in Fig. 7, between the looped portions of each strap portion 28, the looped portions between which the block is placed being here designated $c'$ and $b'$, the block being positioned with its back against the loop $c'$ and having the loop $b'$ extending lengthwise thereof and lying in the channel 52. When the strap portion 28 is then drawn tight it will be seen that the block will be firmly held between the loops $c'$ and $b'$ and accordingly it will also be readily apparent that if a sudden pull is applied to the straps which would tend to cause the occupant of the seat and also the seat itself to rise upwardly and forwardly, as soon as the cable, or cables, engage the undersides of the chassis frame portions 21 to check this movement, the resilient shock absorbers 50 will come into play by being compressed between the looped portions of the straps so as to smoothly check the forward and upward movement of the seat.

While reference has been made particularly to a shock absorbing body or block of sponge or air foam rubber it is to be understood that in referring to a shock absorbing means it is intended that this term shall apply to or cover any other suitable resilient shock absorbing means which would accomplish the desired results such as a spring element or spring elements or the inclusion in the structure of the strap portions 28 as an integral part thereof, of a resilient or stretchable insert or a weave having elastic qualities, such as is well known and employed in various types of straps such as waist belts and the like. In this connection, Fig. 10 illustrates a section of one of these strap portions 28, which section is designated 28', in which is set a panel or insert 28a which may be of elastic such as rubber or the like or this may represent merely an elastic woven portion of the strap material itself.

In the foregoing description of the invention the part to which the straps and the cables are connected has been defined as an angle bar which is placed against the back of the seat structure and secured thereto by screws or in any other suitable manner. If the kit is applied to a seat structure wherein the fixed part may comprise a wooden frame it will be seen that the screw elements can be driven directly into the rear part 12a of such wooden frame without difficulty. See Fig. 1. As previously stated, some types of seat frames may be made of metal in which case it would obviously be necessary to drill a hole to receive the attaching screws and under such conditions use might be made of self threading or thread cutting screws which when forced into drilled holes of proper size would cut their own threads. While the reference number 12a has been used in reference to a fixed wood frame structure it may also identify a metal frame as will be obvious.

It is also to be understood that the invention is not limited to the use of a mounting bar of any specific material or to bars of straight uniform section since many materials other than steel might be found satisfactory for use and also the bar can be varied in weight and section by making it of heavier weight in certain parts where greater stresses may occur. This variation in the weight of the bar can be accomplished by laminating varying lengths of the material as by welding where metal is used or by combining materials of different types.

It is also contemplated that the present invention may be embodied in the original construction of the seat structure rather than being applied to an already built seat structure and Figs. 11 and 12 are illustrative of one method which might be followed for incorporating the invention in the seat structure during the manufacture of the same.

In the last named figures the numeral 55 generally designates a portion of the rear of the seat structure and in this structure the frame for the seat is generally designated 56 and shown as being formed of angle iron material. This frame is of rectangular outline and the rear bar thereof is generally designated 57 and, as shown, has one flange 58 horizontally arranged and directed toward the front of the seat while the other flange 59 is disposed vertically. This rear bar 56 of the seat base frame in this built-in construction corresponds to the angle bar 22 hereinbefore referred to and would be provided in the horizontal and vertical flange portions thereof with necessary and properly located slots, corresponding to the pairs of slots 29—29', 30—30', etc. shown in the bar 22, to have the ends of the strap portions 28 threaded or trained therethrough. In these views only one pair of strap receiving slots is shown, the same being designated 60 and 61 for the flanges 58 and 59 respectively, it being understood, of course, that the bar will have other slots therein in the arrangement shown in Fig. 5 in the bar 22. Also necessary apertures will be formed in a horizontal flange 58 of the bar 56 for the reception of the restraining cables. In these views one cable only is shown and designated 62 and one aperture 63 of a pair for the cable 62 is illustrated. It will, of course, be understood that the necessary two pairs of openings 63 will be provided in the flange 58 to receive the two sides of each of two restraining cables. The numeral 64 designates one of the two portions of a holding strap, the end of which is woven through the cooperating pair of slots 60 and 61 in the same manner as is illustrated in Fig. 4. However, where the invention is embodied in the seat structure at the time of manufacture it will be apparent that the strap portions will also be applied when the seat structure is assembled and installed and also the restraining cables will be applied at this time and will have the ends thereof run through necessary openings in the floor, one only of which is illustrated and designated 65, the floor being here shown in section and designated 66.

Since the manner of running the end of the strap portion 64 through the slots 60—61 is the same as is illustrated in Fig. 4 and hereinbefore described it is not believed that specific description of the manner of attaching the strap portion in this application of the invention is required.

In the arrangement shown in Fig. 11 the vertical flange of the back bar 56 is shown as lying rearwardly of the seat but the structure may also be so designed as to cover the rear part of the bar 56 and the attached end of the strap portion 64 as, for example, in Fig. 12 where the seat cushion covering material which is designated 67 may be provided for each of the strap portions 64 with a grommet 68 through which the strap portion 64 can be carried to bring it to the outside and over the top of the seat.

From the foregoing it will be seen that there is provided by the present invention in one embodiment thereof a new and novel safety device or means which may be provided as a kit unit for addition to existing seat structures and which can be easily and quickly applied to the seat to thereby provide a strong and efficient means by which an occupant of the seat may be kept from injury in the event of sudden stopping of the vehicle for any reason.

In the embodiment wherein the safety device is incorporated in the seat structure at the time of manufacture the angle bar to which the straps and cables are attached becomes an integral part of the seat construction namely, the frame forming the base of the seat, the strap portions being attached to the bar in the same way as they are attached to the bar which is applied to the already constructed seat. In these embodiments it will be seen that there are provided for each strap portion two cooperating guides through which the strap portion is threaded in a novel manner whereby no securing means is employed but the arrangement of the loops one upon the other is such that the connection will be increased in its tightness with increasing pull upon the strap. While the pair of guide slots or apertures for each strap portion is embodied in the one structure they may be formed in separate structures secured to the seat body in the proper adjacent relation for cooperative association with the strap portion.

With the invention in the several embodiments illustrated and described attached to or incorporated in the structure of a seat and tied by the pair of cables to the underlying side portions of the vehicle chassis frame, it will be seen that a sudden stopping of the forward motion of the vehicle will not result in the throwing of the seat upwardly and forwardly or with the separation of the strap carrying bar from the seat and anchoring means and an occupant of the seat will be retained thereon.

The device in the form provided for application to a ready built seat, is easily installed and does not require any alteration in the seat construction or other part of the vehicle body except for the formation of the necessary apertures 39 in the car floor for the passage of the cable ends therethrough. It will also be readily apparent that while the seat and the strap carrying bar are securely anchored against upward and forward movement such as might occur upon sudden stopping of the vehicle, no interference will be encountered with the adjusting of the position of the front seat of the vehicle within the desired forward or rearward adjustment range or the vertical adjustment range, as the flexible character of the holding cable will readily permit this.

It is realized as hereinbefore set forth that the construction of vehicle seats may vary considerably between different makes and/or styles of cars. It will be seen, however, that the invention as embodied in the kit form may be readily installed for use upon any type of fixed or non-removable seat structure, that is, either upon a seat in which a wood frame or base is present or a seat where the base or frame may be of metal, as suitable wood screws, self threading screws, bolts or the like may be employed to effect such installation without material labor.

I claim:

1. A safety kit for use in a vehicle in association with a seat thereof, comprising in combination for use as a unit, an elongate angle bar adapted to be horizontally disposed when in use, said bar having two right-angularly related flanges, said flanges having longitudinally spaced cooperating pairs of slots therein, the slots of each pair being spaced transversely of the bar and each being in one flange adjacent to the free longitudinal edge thereof, a safety strap comprising two sections each having an end portion passing through and secured in a pair of slots, and anchoring means attached to the bar and extending from the outside of the angle.

2. The invention according to claim 1, wherein said anchoring means comprises a pair of flexible cables.

3. The invention according to claim 1, wherein said anchoring means comprises a pair of flexible cables each threaded through a pair of openings in and spaced longitudinally of a flange of the bar adjacent to the angle between the flanges.

4. The invention according to claim 1, wherein the angle bar is a bulb angle bar having a bulb rib along the free longitudinal edge portion of one flange on the outer side of the angle and a bulb rib along the free longitudinal edge portion of the other flange on the inner side of the angle.

5. The invention according to claim 1, wherein the said end portions are reverted whereby one part of the end portion lies between an adjacent part and outer faces of the flanges to be frictionally secured against slippage.

6. For use in a vehicle having a seat, a floor therebeneath and rigid frame members beneath the floor, a safety device comprising an angle bar adapted to be secured lengthwise of the back portion of the seat with one flange disposed vertically and the other flange disposed horizontally under the seat, means securing the bar to the seat, a safety strap secured to the bar and having end portions adapted to be connected together around an occupant of the seat, flexible anchor cables secured to the bar and each having ends adapted to pass through said floor for connection around a frame member, and means for securing together the ends of each cable.

7. In a vehicle having a seat, a floor therebeneath and frame members underlying the floor, a safety device for a passenger occupying said seat comprising an elongate angle bar positioned lengthwise of the back of the seat and having one flange disposed vertically against the back of the seat and the other flange disposed horizontally in opposed relation to the underside of the seat, means securing the bar to the seat, a safety strap secured to the bar and having end portions adapted to extend across the top of the seat for connection around the body of a passenger thereon, and anchor means connected with the bar, extending through the floor and secured to the underlying frame members.

8. The invention according to claim 7, wherein said seat is adapted to be adjusted horizontally and said anchor means is constructed and arranged to permit the horizontal adjustment of the seat.

9. The invention according to claim 7, wherein said seat is adapted to be adjusted horizontally and said anchor means is connected to said frame members to shift relative thereto whereby to permit the horizontal adjustment of the seat.

10. In a vehicle having a seat, a floor therebeneath and frame members underlying the floor, a safety device for a passenger occupying said seat comprising an elongate angle bar positioned lengthwise of the back of the seat and having one flange disposed vertically against the back of the seat and the other flange disposed horizontally in opposed relation to the underside of the seat, means securing the bar to the seat, each of said flanges having at least two longitudinally spaced slots, each slot of one flange being opposite a slot in the other flange transversely of the bar to form a cooperating pair, a safety strap comprising two sections each section having a portion of one end passing through the two slots of a pair and back through the slot in the vertical flange, the other end portions of the straps being adapted to be joined together around a passenger on the seat, and anchor cables connected to the bar, each cable having ends passing through apertures in the horizontal flange and extending downwardly therefrom through apertures in the floor to and around an underlying frame member and having its ends secured together to form a loop around the frame member.

11. In a vehicle having a seat, a floor therebeneath and frame members underlying the floor, a safety device for a passenger occupying said seat comprising an elongate angle bar positioned lengthwise of the back of the seat and having one flange disposed vertically against the back of the seat and the other flange disposed horizontally in opposed relation to the underside of the seat, means securing the bar to the seat, a safety strap secured to the bar and having end portions adapted to extend across the top of the seat for connection around the body of a passenger thereon, and anchor cables connected to the bar, each cable having ends passing through apertures in the floor to and around an underlying frame member and having its ends secured together to form a loop around the frame member.

12. In a vehicle having a seat, a floor therebeneath and frame members underlying the floor, a safety device for a passenger occupying said seat comprising an elongate angle bar positioned lengthwise of the back of the seat and having one flange disposed vertically against the back of the seat and the other flange disposed horizontally in opposed relation to the underside of the seat, means securing the bar to the seat, a safety strap secured to the bar and having end portions adapted to extend across the top of the seat for connection around the body of a passenger thereon, and means forming an operative coupling between the seat and the underlying frame members, anchoring the seat against rising movement.

13. The invention according to claim 7, with spacer blocks between the horizontal flange and the underside of the seat for positioning the top edge of the vertical flange at a predetermined elevation relative to the top of the back portion of the seat.

14. In a vehicle, a seat cushion, a safety strap, means at the rear of the seat cushion providing guides through which an end portion of the strap is threaded and whereby the strap is secured and is extensible from said means across the top of the seat cushion, and means for anchoring said strap securing means to a fixed part of the vehicle structure below the seat.

15. A seat and safety device for a vehicle comprising a seat body, a safety strap, a rigid member secured to the seat body at the back of the latter for securing the safety strap thereto, said rigid member embodying a pair of adjacent cooperating guides through which an end portion of the strap is threaded, and an anchoring cable secured to said member and adapted to connect the latter with a fixed part of the vehicle beneath and separate from the seat.

16. The invention according to claim 15, where in the said threaded end of the strap has an end portion looped back upon itself with said end portion secured in non-slip frictional engagement in the guides between a part of the strap and a part of the member.

17. A seat and safety device for a vehicle comprising a seat body, a safety strap, a member secured to the seat body at the back of the latter for securing the safety strap thereto, said member embodying a pair of guides through which an end of the strap is threaded, and an anchoring cable secured to said member and adapted to connect the latter with a fixed part of the vehicle beneath and separate from the seat, said member constituting a bar disposed longitudinally of the seat and said guides comprise slots in the bar.

18. In a vehicle, a seat structure including a back and seat cushion, a safety strap, strap securing means fixed to the said seat structure adjacent to the rear of the cushion, said strap being attached to the securing means to pass therefrom forwardly between the back and cushion, and means connecting the strap securing means to a fixed part of the vehicle adjacent to the seat structure, and said last means being constructed and arranged to allow a predetermined movement of the seat structure.

19. In a vehicle, a seat structure including a back and seat cushion, a safety strap, strap securing means fixed to the seat structure adjacent to the rear of the cushion, said strap being attached to the securing means to pass therefrom forwardly between the back and cushion, and means connecting the strap securing means to a fixed part of the vehicle below the seat structure, and said last means being constructed and arranged to allow a predetermined movement of the seat structure, said strap being of a length and so constructed and arranged to extend from the back of the seat cushion forward and about a body and for maintaining a body on the seat.

20. In a vehicle, a seat structure designed to have horizontal forward and rearward adjustment, a safety strap, means securing the strap to the rear part of the seat structure, the strap being adapted to extend across the top of the cushion of the seat structure, and a flexible tie cable coupled with said strap securing means and engaging about a fixed part of the vehicle chassis below the seat structure, said flexible cable being of a character to resiliently yield for the making of forward and rearward adjustments of the seat structure.

21. In a vehicle, a seat structure, a safety strap, means for securing an end portion of the strap to the rear portion of the seat structure, the strap being adapted to extend across the cushion of the seat structure, a cable tie connecting the strap securing means with a fixed part of the vehicle structure lying below the seat structure and the vehicle body, and a yieldable shock absorbing means operatively connected with said strap for absorbing shock incident to the application of pulling strain applied to the strap.

22. In a vehicle, a seat structure designed to have both forward and rearward adjusting movement and vertical adjusting movement, a safety strap, means carried by the seat structure and movable therewith for securing an end portion of the strap to the seat structure, the strap being adapted to extend across the cushion of the seat structure, and means anchoring the strap securing means with the vehicle chassis beneath the seat, said anchoring means being so constructed and arranged that forward, rearward and vertical adjustments of the seat structure may be made.

23. In a vehicle, a seat structure designed to have both forward and rearward adjusting movement and vertical adjusting movement, a safety strap, means carried by the seat structure and movable therewith for securing an end portion of the strap to the seat structure, the strap being adapted to extend across the cushion of the seat structure, and means anchoring the strap securing means with the vehicle chassis beneath the seat, said anchoring means being so constructed and arranged that forward, rearward and vertical adjustments of the seat structure may be made, said anchoring means comprising a cable looped around a part of the chassis, the cable being initially of a length to permit full elevation of the seat structure and having slack when the seat structure is lowered, and yieldable means operatively connected with the strap for absorbing shock incident to the checking of shifting movement of the seat structure by the take-up of the slack in the cable.

24. A safety kit for use in a vehicle in association with a seat thereof, said kit comprising in combination an elongate angle bar adapted to receive and be secured to a part of the seat for use, means for anchoring the bar to a fixed part of the vehicle, the angle bar having two substantially right angularly related flanges, said flanges having longitudinally spaced pairs of slots therethrough adjacent to the free edges thereof and the slots in one flange being spaced transversely of the bar from the slots in the other flange, and a safety strap secured in each two transversely spaced slots by having an end portion extending through the slot in one flange from the inside of the flange and across the outer sides of both flanges and over the free edge of the other flange to the inner side thereof and through the slot of the latter flange toward the outer side thereof and then extending back across the outer sides of both flanges to and again through the slot in the said one flange.

References Cited in the file of this patent

UNITED STATES PATENTS

| 2,263,348 | Barros | Nov. 18, 1941 |
| 2,267,373 | Carlisle | Dec. 23, 1941 |
| 2,619,362 | Low | Nov. 25, 1952 |
| 2,622,664 | Koehler et al. | Dec. 23, 1952 |
| 2,689,604 | Hourruitner | Sept. 21, 1954 |

(Other references on following page)

UNITED STATES PATENTS

| | | |
|---|---|---|
| 2,716,561 | Beran | Aug. 30, 1955 |
| 2,771,128 | Doolittle | Nov. 20, 1956 |

FOREIGN PATENTS

| | | |
|---|---|---|
| 1,068,761 | France | Feb. 10, 1954 |

OTHER REFERENCES

Howe: article on "Safety Belts" from Ford Field (periodical), vol. 56, No. 9, pages 16 and 34 only, September 1954 issue.